(12) United States Patent
Kim et al.

(10) Patent No.: US 9,023,920 B2
(45) Date of Patent: May 5, 2015

(54) HIGH-STRENGTH POLYPHENYLENE SULFIDE/POLYETHYLENE TEREPHTHALATE BLEND RESIN COMPOSITION AND METHOD FOR PREPARING THE SAME

(75) Inventors: Sung-Gi Kim, Gyeonggi-do (KR); Jae-Bong Lim, Gyeonggi-do (KR); Jong-In Lee, Gyeonggi-do (KR); Chang-Hyun Lee, Gyeonggi-do (KR); Sung-Su Bae, Gyeonggi-do (KR); Sang-Mook Lee, Gyeonggi-do (KR)

(73) Assignee: SK Chemicals Co., Ltd. (KR)

( * ) Notice: Subject to any disclaimer, the term of this patent is extended or adjusted under 35 U.S.C. 154(b) by 0 days.

(21) Appl. No.: 13/142,911

(22) PCT Filed: Dec. 30, 2009

(86) PCT No.: PCT/KR2009/007961
§ 371 (c)(1),
(2), (4) Date: Jun. 30, 2011

(87) PCT Pub. No.: WO2010/077091
PCT Pub. Date: Jul. 8, 2010

(65) Prior Publication Data
US 2011/0269879 A1 Nov. 3, 2011

(30) Foreign Application Priority Data
Dec. 31, 2008 (KR) .................... 10-2008-0138555

(51) Int. Cl.
| | |
|---|---|
| *C08K 5/34* | (2006.01) |
| *C08K 5/3492* | (2006.01) |
| *C08K 3/38* | (2006.01) |
| *C08K 3/22* | (2006.01) |
| *C08K 3/32* | (2006.01) |
| *C08K 3/26* | (2006.01) |
| *C08K 3/10* | (2006.01) |
| *C08K 3/34* | (2006.01) |
| *C08K 3/40* | (2006.01) |
| *C09B 67/00* | (2006.01) |
| *C08L 67/02* | (2006.01) |
| *C08L 81/02* | (2006.01) |
| *C08K 7/14* | (2006.01) |
| *C08L 23/08* | (2006.01) |
| *C08L 25/08* | (2006.01) |
| *C08L 53/02* | (2006.01) |

(52) U.S. Cl.
CPC ............ *C08L 67/02* (2013.01); *C08K 5/34922* (2013.01); *C08K 7/14* (2013.01); *C08L 23/0869* (2013.01); *C08L 25/08* (2013.01); *C08L 53/02* (2013.01); *C08L 53/025* (2013.01); *C08L 81/02* (2013.01)

(58) Field of Classification Search
USPC ........... 524/89, 100, 502, 494, 404, 413, 418, 524/424, 425, 427, 431, 437, 444, 445, 449, 524/451
See application file for complete search history.

(56) References Cited

U.S. PATENT DOCUMENTS

| | | | |
|---|---|---|---|
| 4,628,072 A * | 12/1986 | Shiraki et al. ................. 525/57 |
| 7,498,375 B2 | 3/2009 | Harashina | |
| 2003/0130405 A1* | 7/2003 | Takagi et al. ................. 524/495 |
| 2005/0004292 A1* | 1/2005 | Harashina et al. ............ 524/430 |
| 2005/0119414 A1* | 6/2005 | Sasagawa et al. ............ 525/242 |
| 2009/0143524 A1 | 6/2009 | Nakayama et al. | |

FOREIGN PATENT DOCUMENTS

| | | |
|---|---|---|
| CN | 1596288 A | 3/2005 |
| CN | 101305055 A | 11/2008 |
| JP | 2-24362 A | 1/1990 |
| JP | 2-251567 A | 10/1990 |
| JP | 3-252455 A | 11/1991 |
| JP | 4-236264 A | 8/1992 |
| KR | 10-0238111 B1 | 10/1999 |
| WO | WO-03/046085 A1 | 6/2003 |

OTHER PUBLICATIONS

"International Application Serial No. PCT/KR2009/007961, International Search Report mailed Aug. 25, 2010", (w/ English Translation), 8 pgs.
"Chinese Application Serial No. 200980153543.4, Office Action mailed Sep. 12, 2012", 7 pgs.
"International Application Serial No. PCT/KR2009/007961, Written Opinion mailed Aug. 25, 2010", (w/ English Translation), 7 pgs.
"International Application Serial No. PCT/KR2009/007961, International Preliminary Report on Patentability dated Aug. 9, 2011", 9 pgs.
"Japanese Application Serial No. 2011-543443, Office Action dated Apr. 30, 2013", 4 pgs.

* cited by examiner

*Primary Examiner* — Kriellion Sanders
(74) *Attorney, Agent, or Firm* — Schwegman Lundberg & Woessner, P.A.

(57) ABSTRACT

The present invention relates to a high-strength inflammable blend resin composition including a polyphenylene sulfide resin and a polyethylene terephthalate resin. More specifically, the resin composition of the present invention includes: a basic blend resin containing 10 to 80 wt. % of a polyphenylene sulfide resin, and 20 to 90 wt. % of a polyethylene terephthalate resin; and 0.1 to 20 parts by weight of a modified polystyrene or a styrene-based elastomer with respect to 100 parts by weight of the basic blend resin.

6 Claims, No Drawings

HIGH-STRENGTH POLYPHENYLENE SULFIDE/POLYETHYLENE TEREPHTHALATE BLEND RESIN COMPOSITION AND METHOD FOR PREPARING THE SAME

CROSS REFERENCE TO RELATED APPLICATION

This application is a nationalization under 35 U.S.C. 371 of PCT/KR2009/007961 filed Dec. 30, 2009 and published as WO 2010/077091 A2 on Jul. 8, 2010, which application claims priority to and the benefit of Korean Patent Application No. 10-2008-0138555, filed Dec. 31, 2008, which applications and publication are incorporated herein by reference in their entirety.

BACKGROUND OF THE INVENTION (a) Field of the Invention

The present invention relates to a high-strength resin composition, and a molded product prepared from the resin composition by thermal curing.

(b) Description of the Related Art

Generally, the polyphenylene sulfide (PPS) resin is excellent in heat resistance, with chemical resistance to most of all solvents and superior dimension stability compared to other thermoplastic resins, and hence can be applied in a variety of industrial fields, ranging from automotive components, or electronic/electrical parts to the applications requiring precision injection molding, such as connectors, bobbins or gears. With a recent expansion of use range of polyphenylene sulfide towards automotive components or the like, increasing attention has been drawn to the enhancement of the mechanical properties of polyphenylene sulfide.

Using the polyphenylene sulfide resin alone enhances chemical resistance and non-flammability, but with a deterioration of mechanical properties. Many studies have been therefore made on different methods for enhancing the mechanical properties of the polyphenylene sulfide resin. For example, KR 10-0238111 proposes the addition of a fibrous filler such as glass fiber in order to improve the mechanical properties of the polyphenylene sulfide resin. Other patent documents also disclose methods for improving the mechanical properties and the electrical characteristics of the polyphenylene sulfide by adding glass fiber.

Besides, a blend resin composition of polyphenylene sulfide and another resin has been suggested but reported to have many problems pertaining to the phase instability that, for example, the blend resin composition is likely to peel off after a finishing process such as a secondary processing.

Accordingly, there has recently been an increasing attention paid for a blend resin composition of a thermoplastic polyphenylene sulfide resin that can be prepared more economically but maintaining mechanical characteristics and non-flammability.

The inventors of the present invention have completed the present invention in an attempt to solve these problems and make a study on a resin composition prepared using polyphenylene sulfide as a basin resin that maintains mechanical properties and has non-flammability.

SUMMARY OF THE INVENTION

Accordingly, it is an object of the present invention to provide a high-strength resin composition including polyphenylene sulfide (PPS) and polyethylene terephthalate (PET), and a preparation method for the resin composition.

To achieve the object, the present invention provides a high-strength resin composition including polyphenylene sulfide and polyethylene terephthalate, and a molded product prepared from the resin composition by thermal curing.

DETAILED DESCRIPTION OF THE EMBODIMENTS

In accordance with an embodiment of the present invention, there is provided a high-strength resin composition that includes: a basic blend resin containing 10 to 80 wt. % of a polyphenylene sulfide resin and 20 to 90 wt. % of a polyethylene terephthalate resin; and 0.1 to 20 parts by weight of a modified polystyrene or a styrene-based elastomer with respect to 100 parts by weight of the basic blend resin.

The polyphenylene sulfide resin included in the high-strength resin composition is, if not limited to, linear, branched, or cross-linked depending on its preparation method. Preferably, the polyphenylene sulfide resin is a linear polyphenylene sulfide resin containing at least 70 mole % of a repeating unit represented by the following formula 1:

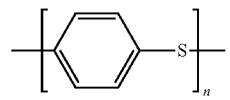

[Formula 1]

The linear polyphenylene sulfide resin containing at least 70 mole % of a repeating unit of the formula 1 has a high degree of crystallinity, with excellences in thermal resistance, chemical resistance, and mechanical strength. The basic blend resin contains the polyphenylene sulfide resin in an amount of 10 to 80 wt. %. The content of the polyphenylene sulfide resin less than 10 wt. % has little effect of improving non-flammability and thermal resistance in the blend, since the polyphenylene sulfide resin excellent in non-flammability and thermal resistance is contained in such a low amount. The content of the polyphenylene sulfide resin greater than 80 wt. % results in a deterioration of elongation, consequently with brittleness.

The polyethylene terephthalate resin used in the high-strength resin composition according to the embodiment may be any polyethylene terephthalate resin normally available. In the present invention, the polyethylene terephthalate resin is preferably used in an amount of 20 to 90 wt. % with respect to the weight of the basic blend resin. The content of the polyethylene terephthalate resin less than 20 wt. % has little economical effect caused by the cut-off of the production cost according to the addition of polyethylene terephthalate, while the content of the polyethylene terephthalate resin greater than 90 wt. % cannot improve the poor hydrolysis resistance of polyethylene terephthalate.

The modified polystyrene used in the high-strength resin composition according to the embodiment has a polystyrene structure of the following formula 2, where $R_2$ is independently any one selected from the group consisting of oxazoline, amine, anhydrous maleic acid, and carboxylic acid:

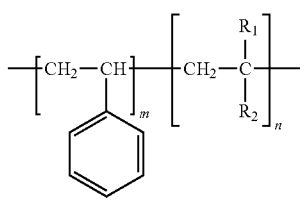

[Formula 2]

where $R_1$ is H or $CH_3$.

The addition of the modified polystyrene contributes to enhancing the mechanical strength of the molded products obtained from the resin composition by thermal curing. As described above, the modified polystyrene is contained in an amount of 0.1 to 20 parts by weight with respect to 100 parts by weight of the basic blend resin. The content of the modified polystyrene less than 0.1 parts by weight with respect to 100 parts by weight of the basic blend resin has little effect of increasing the mechanical properties pertaining to the addition of the modified polystyrene in the resin composition. The content of the modified polystyrene greater than 20 parts by weight causes an excessive phase separation and a failure to achieve a desired mechanical strength, with a deterioration of formability.

The styrene-based elastomer that can be used in combination with the modified polystyrene or as a substitute for the modified polystyrene preferably includes, but is not limited to, a diblock or triblock copolymer of styrene and at least one block selected from the group consisting of butadiene and isoprene. In the diblock or triblock copolymer, a part of the butadiene block and the isoprene block may be hydrogenated. Preferably, at least one selected from the group consisting of oxazoline, amine, anhydrous maleic acid, and carboxylic acid is grafted to a part of the butadiene block and the isoprene block. The use of such a styrene-based elastomer that has oxazoline or the like grafted to a part of the butadiene block or the isoprene block may render the polyphenylene sulfide resin compatible with benzene groups.

The addition of the styrene-based elastomer in the basic blend resin contributes to the enhanced mechanical strength. The content of the styrene-based elastomer less than 0.1 parts by weight with respect to 100 parts by weight of the basic blend resin cannot realize a mechanical strength high enough for compatibility. The content of the styrene-based elastomer exceeding 20 parts by weight causes an extreme phase separation to deteriorate the mechanical strength, consequently with poor formability.

On the other hand, the high-strength resin composition according to the embodiment may further include 5 to 50 parts by weight of a flame retardant with respect to 100 parts by weight of the basic blend resin. The addition of the flame retardant provides the molded products obtained from the high-strength resin composition by thermal curing with non-flammability, but without a deterioration of the mechanical properties such as tensile strength. Hence, the flame retardant is useful in the molded products that require both high strength and non-flammability. The flame retardant as used herein is added to provide the final product with non-flammability in actual contact with fire, and especially required to tolerate thermal decomposition at high temperature. The flame retardant that can be used in the resin composition according to the embodiment of the present invention is not specifically limited and may be used alone or as a composite with another flame retardant. The flame retardant as used herein includes at least one selected from the group consisting of phosphorus-based flame retardant, melamine-based (nitrogen-based) flame retardant, halogen-based flame retardant, and metal hydroxide flame retardant. If necessary, an antimony-based flame retardant aid may be added in case of using a halogen-based flame retardant. The flame retardant preferably includes halogen-based flame retardants, melamine-based flame retardants, or phosphorus-based flame retardants tolerable at high temperature, more preferably melamine-based flame retardants. Advantageously, even a small amount of the melamine-based flame retardant can realize non-flammability.

As described above, the flame retardant is used in an amount of 5 to 50 parts by weight with respect to 100 parts by weight of the basic blend resin. The content of the flame retardant less than 5 parts by weight has little effect of exhibiting the performance of the flame retardant, while the content of the flame retardant greater than 50 parts by weight causes an excessive thermal decomposition of the flame retardant.

According to the embodiment, the high-strength resin composition may further include 5 to 70 parts by weight of a filler with respect to 100 parts by weight of the basic blend resin in order to enhance the mechanical strength and provide thermal resistance.

The filler as used herein is at least one selected from a fibrous filler group consisting of glass fiber, carbon fiber, silica fiber, potassium titanate fiber, titanium fiber, aramide fiber, or asbestos fiber; or a powder filler group consisting of calcium carbonate, talc, silica, barium carbonate, glass bead, alumina, carbon black, lithium carbonate, titanium dioxide, iron oxide, graphite, clay, mica, talcum, calcium silicate, zirconium oxide, boron nitride, and molybdenum disulfide.

As for the filler, glass fiber is preferred in the aspects of reinforced mechanical strength and fabrication process. As mentioned above, the filler is used in an amount of 5 to 70 parts by weight with respect to 100 parts by weight of the basic blend resin. The content of the filler exceeding 70 parts by weight deteriorates both reinforcement and formability. Preferably, the content of the filler is in the range of 10 to 50 parts by weight with respect to 100 parts by weight of the basic blend resin.

Preferably, the filler is a surface-treated fibrous filler, in which case the final product not only has good adhesiveness between the fibrous filler and the resin but also exhibits more stable properties in regard to resistance to water and the coefficient of thermal expansion.

In addition to the principal components of the present invention, the resin composition may further include additives according to a desired use purpose, such as an antioxidant, a pigment, a lubricant, a nucleating agent, a corrosion inhibitor for mold.

In accordance with still another embodiment, the present invention provides a molded product prepared from the high-strength resin composition of the above embodiments by thermal curing. As described above, the molded product may be used for automotive components or electrical parts and, if not specifically limited to, connectors, bobbins, gears, or other applications in a variety of fields. Preferably, the molded product includes: a resin base consisting of a polyphenylene sulfide resin and a polyethylene terephthalate resin; and a modified polystyrene or a styrene-based elastomer dispersed in the resin base. The modified polystyrene or the styrene-based elastomer is more minutely dispersed in the resin base in the state of physical aggregation or chemical aggregation caused by chemical reactions with the contained functional groups, or in the coexistence of physical and chemical aggregations to enhance the mechanical properties of the molded product.

More preferably, a filler and/or a flame retarder can be included as well as the modified polystyrene or the styrene-based elastomer dispersed in the resin base. The types of the flame retardant and the fillers are as specified in the embodiments of the high-strength resin composition.

The resin composition of the present invention, when made into a molded product, realizes high strength and non-flammability in case of using a flame retardant, and hence can be applied in various industrial fields ranging from automotive components or electronic/electrical parts to the applications requiring precision injection molding, such as connectors, bobbins or gears.

Hereinafter, the present invention will be described in further detail with reference to the examples and comparative examples, which are not intended to limit the scope of the present invention.

EXAMPLES 1 TO 7

Preparation of Molded Product from PPS-PET Blend Resin Composition Containing Modified Polystyrene or Styrene-Based Elastomer For extrusion, in the hopper of Haake plasticoder equipped with a single-screw extruder (L/D=25, D=19 mm) were added polyethylene terephthalate (PET) (SKYPET, SK Chemical) in weight percentage (as given in Table 1) with respect to 1 kg of the polyphenylene sulfide (PPS) resin (Fortron, Deyang); and oxazoline-modified polystyrene (Epocros, Nippon Shokubai), styrene-ethylene-butadiene-styrene (Kraton, Shell) as a styrene-based elastomer A or anhydrous maleic acid and carboxylic acid modified styrene-ethylene-butadiene-styrene (Kraton, Shell) as a styrene-based elastomer B, melamine phosphate (Chempia) as a melamine-based flame retardant, and short glass fiber (Vetrotex), in parts by weight (as given in Table 1) with respect to 100 parts by weight of the polyphenylene sulfide resin and the polyethylene terephthalate. The set temperature of the extruder was 300° C. and the screw speed was 100 rpm. The extruded blend strand was frozen and made into pellets.

The blend pellets thus obtained were dried out in a vacuum oven at 60° C. for 24 hours and extruded into test specimens for tensile strength testing through an extruder (Arburg).

COMPARATIVE EXAMPLES

Comparative Examples 1, 2 and 3

Preparation of Molded Product from PPS-PET Blend Resin Composition not Containing Modified Polystyrene or Styrene-Based Elastomer Procedures were carried out in the same manner as described in the Examples, excepting that a blend according to the composition of Table 1 was prepared without using either a modified polystyrene or a styrene-based elastomer. The blend was extrusion-molded and made into pellets in the same manner as described in the Examples.

Comparative Examples 4 and 5

Procedures were carried out in the same manner as described in the Examples, excepting that the resin composition was prepared to contain polyethylene terephthalate and a flame retardant without using either a modified polystyrene or a styrene-based elastomer. The ingredient contents of the resin composition were as given in Table 1. The resin composition was extrusion-molded and made into pellets in the same manner as described in the Examples.

EXPERIMENTAL EXAMPLES

Property Measurement of Molded Product According to Examples and Comparative Examples 1. Tensile Strength Each specimen was tested for tensile strength seven times with a universal test machine (Lloyd Instruments), and an average of the measurement results was calculated.

2. Non-Flammability

Flammability was measured according to the UL94 VB standards. The specimens non-flammable were rated as UL94 V0, V1 or V2, and the specimens without non-flammability were rated as X. The results are presented in Table 1.

Table 1 shows the blend resin compositions according to the Examples and the Comparative Examples, and the tensile strength and the non-flammability of the molded products prepared from the respective blend resin compositions. In the resin composition, the contents of polyphenylene sulfide and polyethylene terephthalate were given in the unit of weight percentage, and the contents for other ingredients including modified polystyrene were given in the unit of part by weight with respect to 100 parts by weight of polyphenylene sulfide and polyethylene terephthalate.

TABLE 1

|  | Example | | | | | | | Comparative Example | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| Polyphenylene Sulfide | 40 | 40 | 40 | 40 | 30 | 30 | 30 | 60 | 40 | 20 | — | — |
| Polyethylene Terephthalate | 60 | 60 | 60 | 60 | 70 | 70 | 70 | 40 | 60 | 80 | 100 | 100 |
| Modified Polystyrene | 1 | — | — | — | 1 | — | 1 | — | — | — | — | — |
| Styrene-based Elastomer A | — | 1 | — | 1 | — | — | — | — | — | — | — | — |

TABLE 1-continued

|  | Example | | | | | | | Comparative Example | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| Styrene-based Elastomer B | — | — | 1 | — | — | 1 | — | — | — | — | — | — |
| Flame Retardant | — | — | — | 15 | 15 | 15 | — | — | — | — | 40 | 20 |
| Filler | — | — | — | 50 | 50 | 50 | 50 | — | — | — | — | — |
| Tensile Strength (MPa) | 78 | 67 | 70 | 12 | 14 | 13 | 16 | 43 | 60 | 52 | 30 | 40 |
| Non-flammability | X | X | X | V0 | V0 | V0 | X | X | X | X | V0 | V2 |

Note)
X: without non-flammability

It can be seen from the results of Table 1 that the molded product of Example 1 containing a modified polystyrene resin added to the PPS-PET basic resin blend had an enhanced tensile strength, compared to the molded products of Comparative Examples 1, 2 and 3 not containing the modified polystyrene resin. Likewise, the molded products of Examples 2 and 3 containing a styrene-based elastomer added to the PPS-PET basic resin blend was enhanced in tensile strength, relative to the molded products of Comparative Examples 1, 2 and 3.

In Comparative Examples 4 and 5, a flame retardant was added in order to provide the polyethylene terephthalate composition with non-flammability. The molded product of Comparative Example 4 containing 40 parts by weight of a flame retardant with respect to 100 parts by weight of polyethylene terephthalate was rated the V0 level in the flammability test, but with a drastic deterioration of tensile strength, so the composition was turned out to be inappropriate for the preparation of molded products. Likewise, the molded product of Comparative Example 5 having a little lower content of the flame retardant had a somewhat higher value of tensile strength, but not enough for high-strength products, and got the V2 level in the flammability test, that is, less non-flammable compared to the molded product of Comparative Example 4.

As demonstrated in Examples 4, 5 and 6, the use of both the flame retardant and the filler far more enhanced non-flammability and tensile strength. In particular, the addition of the flame retardant caused no deterioration of physical properties such as tensile strength. In conclusion, the molded products prepared from the resin composition of the present invention by thermal curing are applicable in a wide range of industrial fields in regard to the fabrication of molded products that require high strength.

What is claimed is:

1. A high-strength resin composition comprising:
   a basic blend resin including 10 to 80 wt. % of a polyphenylene sulfide resin and 20 to 90 wt. % of a polyethylene terephthalate resin; and
   0.1 to 20 parts by weight of a modified polystyrene with respect to 100 parts by weight of the basic blend resin, wherein the modified polystyrene is represented by Formula 2:

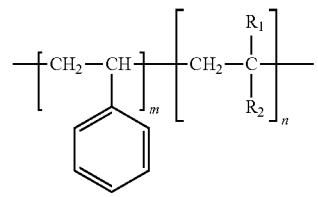

[Formula 2]

wherein $R_1$ is H or $CH_3$; and $R_2$ is independently any one selected from the group consisting of oxazoline, amine, anhydrous maleic acid, and carboxylic acid;
   5 to 50 parts by weight of a flame retardant with respect to 100 parts by weight of the basic blend resin, wherein the flame retardant is selected from the group consisting of phosphorus-based flame retardant, melamine-based flame retardant, halogen-based flame retardant, and metal hydroxide flame retardant, and
   5 to 70 parts by weight with respect to 100 parts by weight of the basic blend resin of at least one filler selected from a fibrous filler group consisting of glass fiber, carbon fiber, silica fiber, potassium titanate fiber, titanium fiber, aramide fiber, or asbestos fiber; or a powder filler group consisting of calcium carbonate, talc, silica, barium carbonate, glass bead, alumina, carbon black, lithium carbonate, titanium dioxide, iron oxide, graphite, clay, mica, talcum, calcium silicate, zirconium oxide, boron nitride, and molybdenum disulfide.

2. The high-strength resin composition as claimed in claim 1, wherein the polyphenylene sulfide resin contains at least 70 mole % of a repeating unit represented by Formula 1:

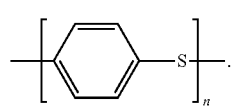

[Formula 1]

3. The high-strength resin composition as claimed in claim 1, wherein the flame retardant is a melamine-based flame retardant.

4. The high-strength resin composition as claimed in claim 1, wherein the filler is glass fiber.

5. The high-strength resin composition as claimed in claim 1, further comprising:
   at least one additive selected from the group consisting of an antioxidant, a pigment, a lubricant, a nucleating agent, and a corrosion inhibitor for mold.

6. A molded product prepared from the resin composition as claimed in claim 1 by thermal curing.

\* \* \* \* \*

UNITED STATES PATENT AND TRADEMARK OFFICE
CERTIFICATE OF CORRECTION

| | | |
|---|---|---|
| PATENT NO. | : 9,023,920 B2 | Page 1 of 1 |
| APPLICATION NO. | : 13/142911 | |
| DATED | : May 5, 2015 | |
| INVENTOR(S) | : Kim et al. | |

It is certified that error appears in the above-identified patent and that said Letters Patent is hereby corrected as shown below:

In the claims

In column 8, line 41, in Claim 1, delete "aramide" and insert --aramid--, therefor Signed and Sealed this
Sixth Day of October, 2015

Michelle K. Lee
*Director of the United States Patent and Trademark Office*